Aug. 23, 1938.  E. R. LOCHMAN  2,127,745
HEADSTOCK FOR A GENERAL UTILITY MACHINE TOOL
Original Filed Sept. 30, 1932   3 Sheets-Sheet 1
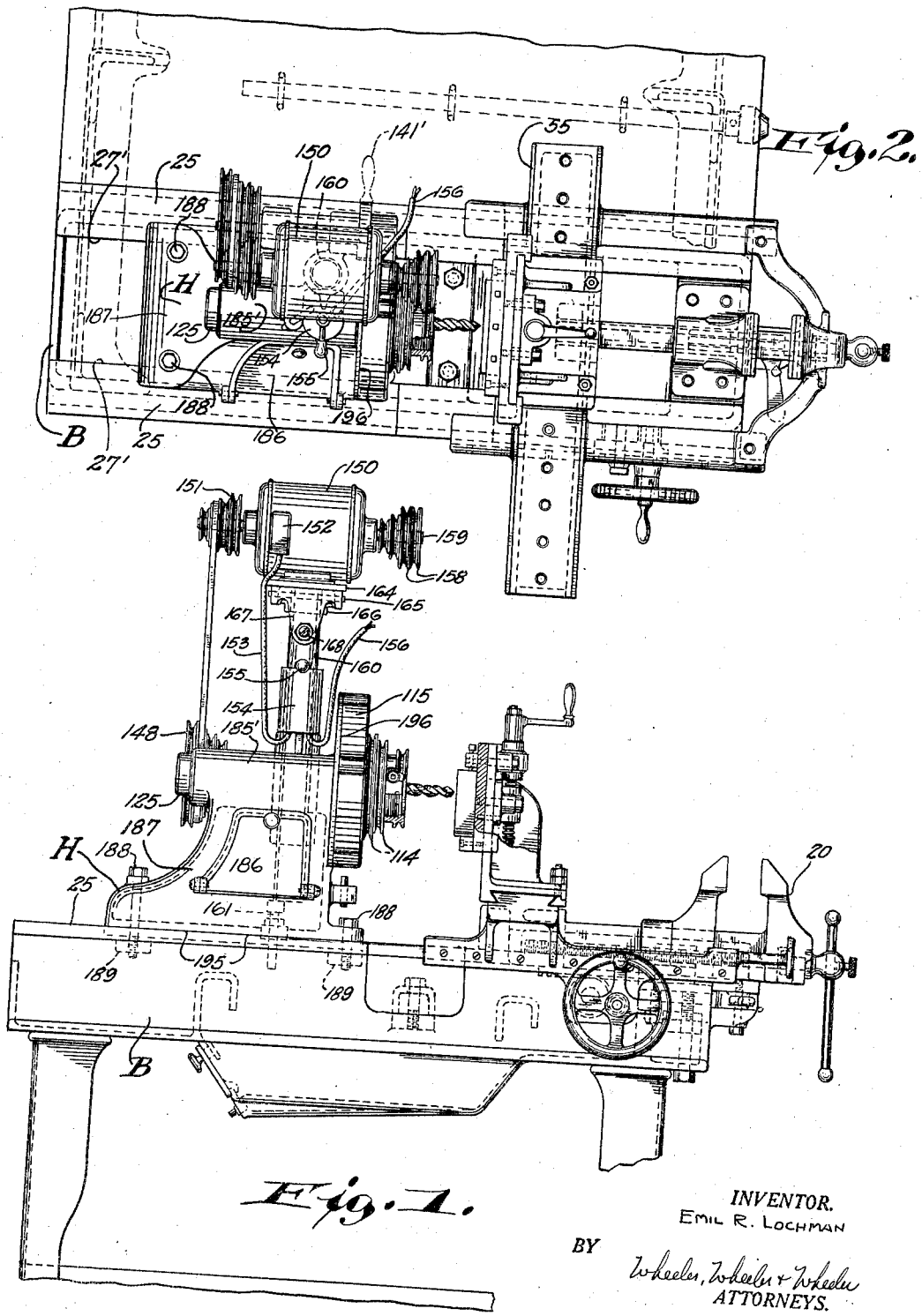
INVENTOR.
Emil R. Lochman
BY
Wheeler, Wheeler & Wheeler
ATTORNEYS.

Aug. 23, 1938.  E. R. LOCHMAN  2,127,745
HEADSTOCK FOR A GENERAL UTILITY MACHINE TOOL
Original Filed Sept. 30, 1932   3 Sheets-Sheet 2
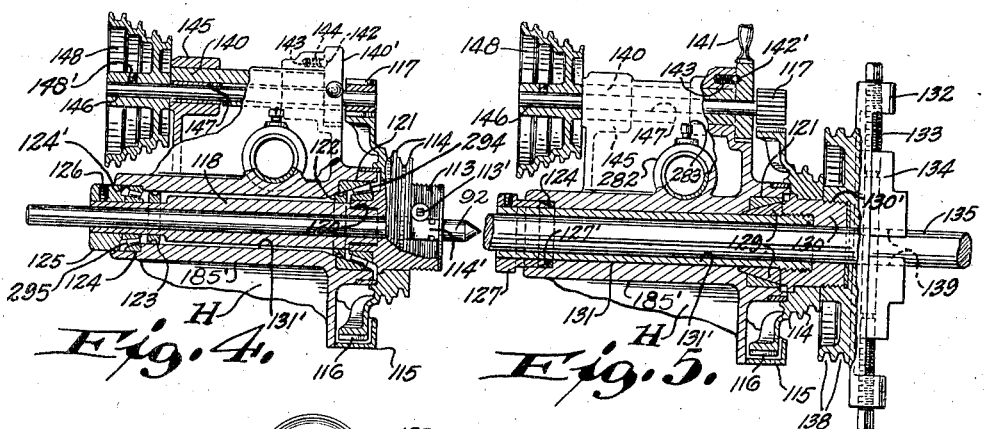
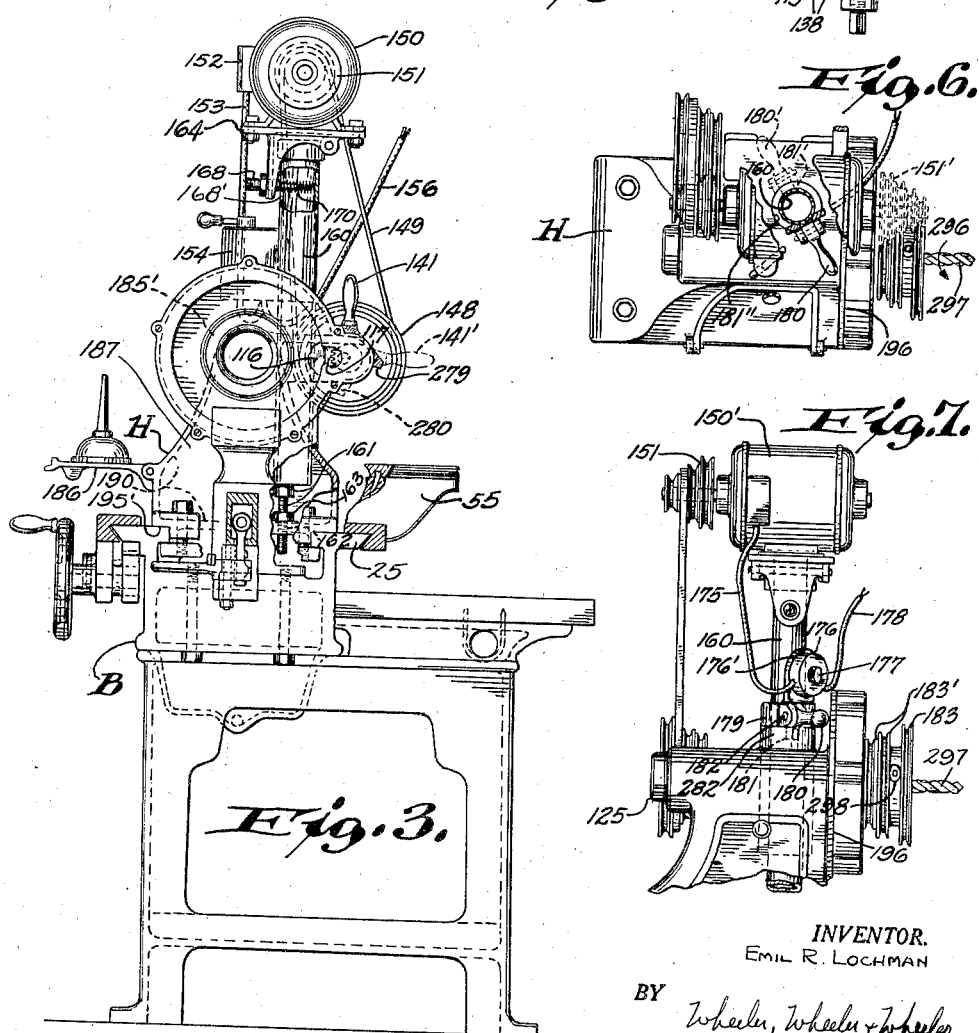
INVENTOR.
EMIL R. LOCHMAN
BY Wheeler, Wheeler & Wheeler
ATTORNEYS.

INVENTOR.
Emil R. Lochman
BY
Wheeler, Wheeler & Wheeler
ATTORNEYS.

Patented Aug. 23, 1938

2,127,745

UNITED STATES PATENT OFFICE 2,127,745

HEADSTOCK FOR A GENERAL UTILITY MACHINE TOOL

Emil R. Lochman, Milwaukee, Wis.

Original application September 30, 1932, Serial No. 635,535. Divided and this application July 29, 1936, Serial No. 93,888

21 Claims. (Cl. 82—28)

This invention relates to a headstock for a general utility machine tool. The present application is a division of my Patent 2,050,347 on a General utility machine tool, granted August 11, 1936.

One of the objects of the invention is to provide a headstock having a standard adjustable as to height, upon which the driving motor is mounted for movement on a bed unitarily with the headstock, and for adjustment both vertically and pivotally.

Other objects of the invention relate to the provision of a special driving arrangement from such a motor to the headstock spindle, the motor armature shaft being provided with pulleys or stepcones at both ends upon which a single driving belt is readily interchangeable and used for direct as well as back gear driving.

A further object of the invention includes the provision of exchangeable spindle units, in which hollow spindles of larger or smaller diameter fit the same headstock, each carrying its own respective driving gear and sheave and being adjustable axially as well as interchangeable with other spindles.

Another object of the invention is to provide a headstock spindle having a permanent chuck carrying the driving means for the spindle, and in which a system of long adjustable centers may be mounted.

In the accompanying drawings:

Figure 1 is a side elevation of a complete machine embodying my invention as it appears when set up for drilling.

Figure 2 is a top view of the machine.

Figure 3 is an end view thereof.

Figure 4 is a view partially in plan and partially in horizontal section of the headstock spindle and back gear drive, with associated bearings and related parts of the headstock.

Figure 5 is a view similar to Figure 4, showing a different spindle and bore.

Figure 6 is a top plan view of the headstock, with parts broken away to show the motor adjustment.

Figure 7 is a side elevational fragmentary view of the headstock.

Figure 8:
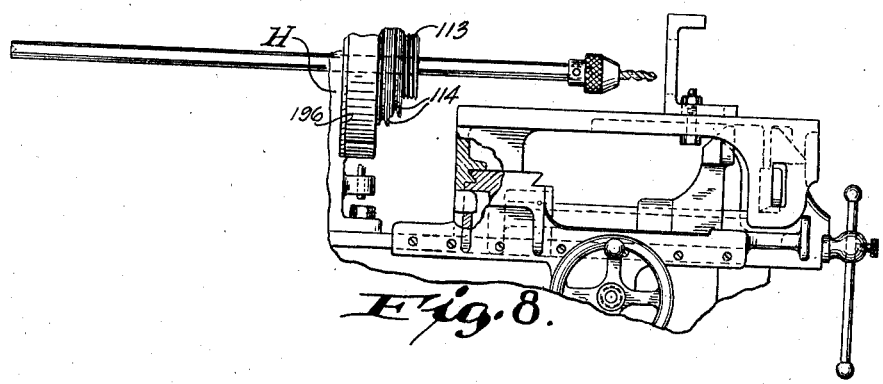
Figure 8 is a fragmentary side elevation of the entire apparatus, showing a long centering bar with chuck and drill for horizontal boring, mounted in the headstock spindle.
Figure 9:
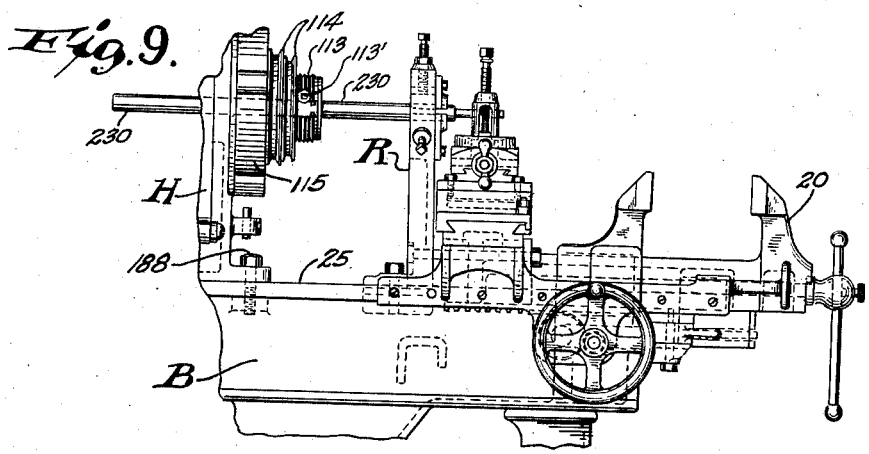
Figures 9 and 10 are similar views in side elevation, showing the device set up for turning bar stock and heavier work, respectively.
Figure 10:
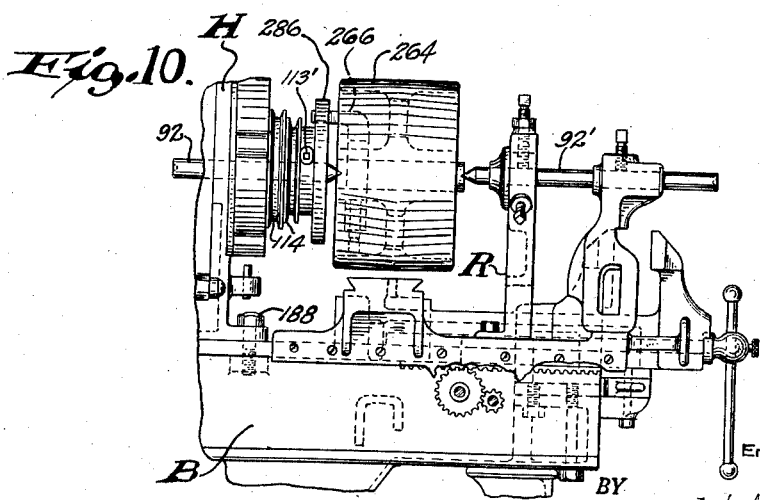

For a more particular description of the general organization of the tool reference is made to the above Patent 2,050,347. The tool frame comprises a bed B upon which the tool slide S and the headstock H are individually adjustable to and from each other.

The headstock H will now be described. The main body 187 has guideways 195' at the bottom fitting the rails 25 of the bed B, as well as their inner edges 27', see Fig. 2, on which the headstock is adjustably mounted by capscrews 188 engaging bars 189 into which they are tapped for mounting.

The upper part of the body terminates in the spindle casing 185' having a bore 181' and counterbores 294 and 124' into which the cups 121 and 124 of the roller bearings 294, 295 are pressed, the inner races of said roller bearings being pressed onto the spindle 118 as shown. The oil retainers 122, 123 are also pressed lightly into their respective places, so they retain the lubricating oil for their respective bearings in a manner to circulate through the rollers; then the adjusting nut 125 is screwed on the reduced and threaded rear end of the spindle 118 and tightened until all lost motion is taken out of the spindle, then the setscrew 126 is tightened and the spindle is ready to run.

One of the new features of this spindle is the permanent chuck forming its head. While the outside of same has a screw thread for holding other chucks, pulleys or the like, the rear end of said permanent chuck carries the combination sheave and gear 114, 116 for direct as well as back-gear driving of said spindle. Said permanent chuck 113 has a double jaw 114' and the operating screw 113' and is preferably forcibly screwed onto the reduced front end 120 of the spindle 118, and said chuck and spindle have an accurately machined bore throughout of the limit capacity of said chuck, for receiving bar or pipe stock, held for operations by said chuck, or for holding the long center bars, for alining, spotting or holding work for various operations. Said chuck is self-centering and is further used for holding drills, reamers and other tools.

The front of the headstock is reinforced by the large flange 196 on which the gearcasing 115 is mounted, covering the large gear 116 as well as the pinion 117, the latter being mounted on shaft 146, passing through the eccentric bearing 147, of the eccentric 140 which is pivotally mounted in bearings 145 and has a flange 140', provided with a handle 141, which, when in upright position as shown in Figs. 3 and 4, brings the pinion 117 in engagement with the gear 116, and when in dotted position it turns the eccentric for disengaging said pinion from said gear, in which position the nose 279 strikes the face 280 for a stop.

A socket 143 is bored into the wall of the bearing 145 receiving the spring 144 and on top of it the ball 142 which the spring holds in the countersinks 142' provided for each position of said handle 141 retaining it in its set positions, by yielding contact. Fig. 5 shows said pinion and related parts out of engagement with the gear 116. Figure 5 further illustrates the exchangeable spindle unit for the headstock H, fitting the same bore 131', but having the roller bearings 294, 295 removed, however retaining their respective cups 121, 124 of hardened ground steel. This arrangement provides the space for the spindle 131 with its larger diameter and larger bore, for handling bar and pipe stock of considerable diameter.

A spindle nose 130 is forcibly screwed on the spindle 131 and forms part of it, having the same diameter as the chuck 113, and carrying the same combination sheave and gear 114, 116; the cone 129 preferably of hard bronze is also firmly mounted on the spindle and forms part of it, and the adjusting nut 127 is screwed on the rear end of said spindle, and meshing with the taper cup 127' is adjusted to take out endplay and lost motion of the spindle, while the bore 131' forms the main bearing of it. A large chuck 132 having jaw screws 133 and jaws 134 with gripping faces 139 holds the stock 135; it further has a double sheave 138 cast onto the rear part of its body, and a threaded hub fitting the thread 130' of the spindle nose. Said chuck has a hole fitting the bore of the spindle for passing and centering the stock having the same size, it has the regular drive as the spindle 118, but in addition thereto is provided with said double sheave 138 which registers with the double sheave 158 carried by motor 150 and its shaft 159 and is for the purpose of furnishing a double belt, powerful direct drive to suit the capacity for larger stock handled by said chuck. The stepcone 148 is mounted on the rear end of shaft 146 and meshes with the stepcone 151 providing four differing driving speeds for the back gear or pinion 117.

The reversing motor 150 is mounted on the adjustable platform 164 having a bracket 167, pivotally mounted on the lug 166 by the pivot 165, said lug being cast on the end of the supporting tube 160 which has a slotted hole 168' through which the adjusting screw 168 extends and is tapped into the bracket 167 and has a reduced inner section holding the compression spring 170 against the inner wall of tubing 160, so that said adjusting screw 168 may be set to give proper spring tension to the driving belt 149 connecting said stepcones 151, 148. The entire motor is further adjustable vertically and pivotally by thus adjusting its supporting tube 160 whose lower edge rests on the screw 161 (see Figs. 1 and 3) tapped through the lug 162 and held in its adjusted position by nut 163. For pivotal adjustment as required for the non-reversible motor 150', the round vertical socket 282 furnishes the bearing for the supporting tube 160 to which the collar 179 is mounted and on which the handle 180 having a nose 181 fitting into suitable slots 181' is holding said motor 150' in its position shown in Fig. 7 for driving the back gear.

In Fig. 6 the motor and its stepcone are shown in dotted position 151', as is the handle 180' for connecting with the direct drive sheaves 183, 183', of which the sheave 183 is screwed on separately and has a slot 298 to still reach the operating screw 113' of the permanent chuck 113.

It will be noted that in either position said motor 150' turns the spindle in the customary direction of arrow 296 required for a right hand drill 297, and it only requires lifting of said handle 180 turning on its pivot 182 to lift the nose 181 out of its socket, give the motor its required half turn with said handle and drop it in the opposite slot 181'. A further slot 181'' is provided for giving the motor only a quarter turn, so a belt may be run to any apparatus held on the crossbeam 55, or other locations.

The non-reversible motor 150' is lower priced, as is the common on and off switch 176 with its turning knob 177; and said switch is mounted on the flange 176' forming part of collar 179 as shown in the sectional view in Fig. 6, (see lines 6—6 of Fig. 7).

The line wire 178 supplies the electric current to said switch, from which it is transferred to the motor 150' by the connecting wire 175. Figs. 1, 2 and 3 show the reversing motor 150 with its connecting socket 152 from which the cable 153 leads to the reversing switch 154, and said switch is supplied with electric current by the line cable 156, so that said motor may be driven right or left hand, for either back gear or direct driving by switching the handle 155 from its shown "off" position either to the right, or to the left. Said switch 154 is suitably mounted on the supporting tube 160, so that for assembling or shipping said motor 150 may be mounted on its platform 164 and properly wired and connected to said switch, and this motor unit being all assembled on said tube 160, is then lifted out or inserted into the vertical socket 282, is vertically adjusted by the screw 161 for the proper length and tension of the driving belt, and then locked in its proper position by the lock nut 163.

Said hollow storage section 190 of the headstock H, by opening said door 186, also furnishes access to said adjusting screw 161.

In Fig. 3 the movable jaw 20 and other parts are irregularly broken away to best bring out the construction of the headstock and its related parts, leaving the spindle out entirely and showing only a small section of gear 116 to show its meshing with the pinion 117.

The rest unit R may be used in turning the barstock or may be set up as a tailstock when the device is used for turning heavy work. The barstock 230 is simply guided in the rest R and is mounted in the tubular headstock spindle like the removable center pin 92 normally used therein.

When used as a part of the tailstock it supports a centering pin 92', the work being centered by pins 92 and 92' and driven from the face plate 286 and dog 266. The work illustrated at 264 is a heavy pulley, but other heavy work may be handled in like manner.

I claim:

1. In a machine of the character described, the combination with a headstock standard having a telescopically extensible portion, of a spindle journaled in said standard, a motor carried by said portion, driving connections from the motor to the spindle, and a bed provided with a guideway upon which said standard is movable unitarily with said motor and connections.

2. In a utility machine tool, the combination with a bed, of a headstock standard movable thereon and provided with spindle bearings, a spindle journaled in said bearings, an adjustable extension carried by said standard for movement unitarily therewith upon said bed, a motor carried by said extension and vertically and pivotally adjustable thereon, and driving connections carried by said standard for transmitting motion from said motor to said spindle.

3. In a machine of the character described, the combination with a headstock provided with bearings, of a spindle rotatable in certain of said bearings, an intermediate shaft rotatable in others of said bearings and operatively connected to said spindle, a motor mounted on said headstock above said bearings, and means for alternatively connecting said motor with opposite ends of said spindle and intermediate shaft respectively.

4. In a machine of the character described, the combination with a headstock providing bearings for adjacent spindle and intermediate shafts, of spindle and intermediate shafts respectively mounted in said bearings and operatively interconnected, a chuck on the spindle, a pulley connected with the chuck, a pulley connected with the opposite end of the intermediate shaft, and a motor adjustably supported on the headstock and provided with means including a belt interchangeably adapted for connecting said motor alternatively with either of said pulleys.

5. In a machine of the character described, the combination with a headstock and a spindle rotatable therein, said headstock being provided with a tubular socket at right angles to the spindle, of a headstock motor provided with a mounting post adjustable in said socket, and driving means operatively connecting said motor and spindle.

6. A device of the character described including a headstock provided with spindle and intermediate shaft bearings, of a spindle and shaft rotatable in said bearings and provided with driving pulleys at opposite ends, a tubular socket connected with said headstock and extending at right angles to said bearings, a mounting post rotatably and axially adjustable in said socket, and a motor mounted on said post and provided with a pulley registerable upon rotation of said post with the pulleys of said spindle and shaft respectively.

7. In a machine of the character described, the combination of a support for shafts of differing sizes, said support having a bore sufficiently large to receive the shaft of maximum diameter, axially spaced bearing races mounted in said support at the ends of said bore, and shafts interchangeably receivable in said bore and respectively provided with different types of bearings coacting with said races.

8. In a machine of the character described, the combination of a support for shafts of differing sizes, said support having a bore sufficiently large to receive the shaft of maximum diameter, axially spaced bearing races mounted in said support at the ends of said bore, and shafts interchangeably receivable in said bore and respectively provided with different types of bearings coacting with said races, the larger of said shafts having bearing means relatively fixed thereto coacting with said races, and the smaller of said shafts having anti-friction bearings mounted thereon and engageable with the same races.

9. In a device of the character described, the combination with a tubular spindle and a chuck fixed to the end thereof and aligned with the opening therethrough, of an extension spindle slidable through the bore of said first mentioned spindle and engageable by said chuck to fix its axial position therein.

10. In a machine of the character described, a headstock comprising a hollow body section provided with a door opening, driving means adjustable with reference to said section, and adjusting means housed within said section and accessible through said door opening.

11. In a general purpose machine, a motor mounting unit comprising a column, a mounting head at the end of the column, a platform pivotally mounted on said head and having a depending lug, an adjusting screw passing through said lug and provided with a shoulder, and a spring bearing against the inner wall of the column seated against said shoulder whereby to tend to oscillate said plate about its fulcrum, said platform comprising a motor support upon which the compression of said spring will adjust said motor in a belt tightening direction.

12. In a machine of the character described, the combination with a headstock provided with bearings, of a spindle rotatable in certain bearings thereof, an intermediate shaft rotatable in others of said bearings, a headstock extension adjustable with respect to the headstock, a motor mounted on said extension, connections for the primary actuation either of said spindle or said intermediate shaft from said motor, and connections for the operation of said spindle from the intermediate shaft when the intermediate shaft is primarily actuated.

13. In a machine of the character described, the combination with a headstock provided with a plurality of shafts, driving means connecting said shafts, pulleys mounted on said shafts at opposite ends thereof, a headstock extension adjustable with respect to the headstock, a motor mounted on the extension, and driving pulley means carried by said motor and adapted for belt connection selectively with the pulleys of the respective shafts, whereby either shaft may be primarily driven, at least one of said shafts comprising a machine tool spindle.

14. In a machine of the character described, the combination with a headstock provided with a plurality of shafts, driving means connecting said shafts, pulleys mounted on said shafts at opposite ends thereof, a headstock extension adjustable with respect to the headstock, a motor mounted on the extension, and driving pulley means carried by said motor and adapted for belt connection selectively with the pulleys of the respective shafts, whereby either shaft may be primarily driven, at least one of said shafts comprising a machine tool spindle, said motor being mounted for pivotal movement in a direction to reverse it end for end, whereby to facilitate the driving of the shafts in either direction.

15. In a general purpose machine tool, the combination with a headstock and a driving shaft carried thereby, of a back shaft mounted on the headstock, said driving shaft having pulleys at both ends and said back shaft having complementary pulley means at one end, a spindle connected with the back shaft and having pulley means complementary to the pulleys at the other end of the driving shaft, the pulley means of the back shaft and spindle being at like center distances from the pulleys of the driving shaft, whereby interchangeably to employ a single belt.

16. In a general purpose machine tool, the combination with a headstock and a driving shaft carried thereby, of a back shaft mounted on the headstock, said driving shaft having pulleys at both ends and said back shaft having complementary pulley means at one end, a spindle connected with the back shaft and having pulley means complementary to the pulleys at the other end of the driving shaft, the pulley means of the back shaft and spindle being at like center distances from the pulleys of the driving shaft, whereby interchangeably to employ a single belt, said spindle being tubular and extending through the headstock and provided with a face plate and jaws adjustable with respect thereto for engagement with a tool or work to position it in the tubular spindle.

17. In a machine of the character described, the combination with a headstock and a spindle rotatable therein, said headstock being provided with a generally upright mounting post, of a headstock motor adjustably mounted on said post for movement with respect to said spindle, and driving means operatively connecting said motor and said spindle.

18. In a machine of the character described, the combination with a headstock and a spindle rotatable therein, said headstock being provided with a generally upright mounting post, of a motor supported by said post, means for vertical adjustment of said motor with respect to said spindle, means for fixing said motor in a predetermined adjustment, and driving means operatively connecting said motor and spindle.

19. In a machine of the character described, the combination with a headstock and a spindle rotatable therein, a plurality of pulleys operatively connected with said spindle for the operation thereof, a generally upright mounting post carried by said headstock, a motor mounted on said post and provided with a driving pulley, and means for bodily shifting said motor in a direction to adjust its pulley about said post to positions for registration with the several pulleys aforesaid, and a belt for alternatively driving the one or the other of said spindle actuating pulleys from said motor pulley.

20. In a machine of the character described, the combination with a headstock and a spindle rotatable therein, said headstock being provided with a generally upright mounting post, of a motor mounted on said post and provided with a driving pulley, a driven pulley on said spindle, belt means normally connecting said pulleys for the driving of said spindle, and means whereby said motor is bodily rotatable on said post, whereby to move the motor pulley out of a position for registration with said driven pulley.

21. In a machine of the character described, the combination with a headstock, a spindle rotatable therein and a second shaft mounted for rotation, said spindle and second shaft being each provided with driven pulleys, of a generally upright mounting post carried by said headstock, a headstock motor supported by said mounting post and provided with a driving pulley and a belt for alternative connection with the pulleys of said headstock and said second shaft respectively, and means whereby said motor is adjustable on said post to operative driving positions with respect to said driven pulleys.

EMIL R. LOCHMAN.